(No Model.) 5 Sheets—Sheet 1.

H. BRANDENBURG.
ELECTRIC RAILWAY.

No. 560,678. Patented May 26, 1896.

WITNESSES
Wm A. Youmans
N. G. Paterson

INVENTOR
Henry Brandenburg (No Model.) 5 Sheets—Sheet 2.
H. BRANDENBURG.
ELECTRIC RAILWAY.

No. 560,678. Patented May 26, 1896.

WITNESSES
INVENTOR
Henry Brandenburg (No Model.)   H. BRANDENBURG.   5 Sheets—Sheet 4.
ELECTRIC RAILWAY.
No. 560,678.   Patented May 26, 1896.

WITNESSES   INVENTOR
Henry Brandenburg

UNITED STATES PATENT OFFICE.

HENRY BRANDENBURG, OF CHICAGO, ILLINOIS.

ELECTRIC RAILWAY.

SPECIFICATION forming part of Letters Patent No. 560,678, dated May 26, 1896.

Application filed March 11, 1895. Serial No. 541,386. (No model.)

*To all whom it may concern:*

Be it known that I, HENRY BRANDENBURG, a citizen of the United States, residing at Chicago, Illinois, have invented new and useful Improvements in Electric Railways, of which the following is a specification.

My invention in an electric railway relates to novel and simple devices for conveying and connecting the electric current with the motors in the cars. I use a hollow circular-slotted metal tube for the supply-conductor, which is located in another tube having a slot or jaws extending outward and composed of flexible hard and soft insulating material. The tubes thus arranged are located anywhere desired along the railway. In the chamber of the conductor I insert a sliding brush-trolley, which extends out through the slots or jaws of the tubes and is connected by wire to the motor in the cars and drawn by a cable or bar located ahead. The jaws of the tube are closed in its normal condition, but open by expansion as the trolley-plate passes along. The trolley-brush is a little larger than the conductor-tube and is preferably composed of suitable metal threads or small spring-like wire filling the entire space, thus making good electrical contact, and is drawn along practically without friction. The trolley-plate (extending out through the jaws through which the current passes to the motor) is insulated with enameled material to save the current and to make it antifrictional while running at any rate of speed through the jaws, which are also non-conductive and antifrictional.

The object of my invention is to furnish a system where the electric current can be conveyed without undue loss or leakage and the electric contact and connection to the motor are direct and the friction reduced to a minimum—a system that is simple, inexpensive, and can be operated without danger or hindrance in all conditions of climate and adapted to any railroad.

I do not limit my invention to the prescribed details of the specification and drawings, as they may be modified without departing from the spirit of my invention.

In order that those skilled in the art may construct and operate my invention, I herewith describe it specifically.

Figure 1:
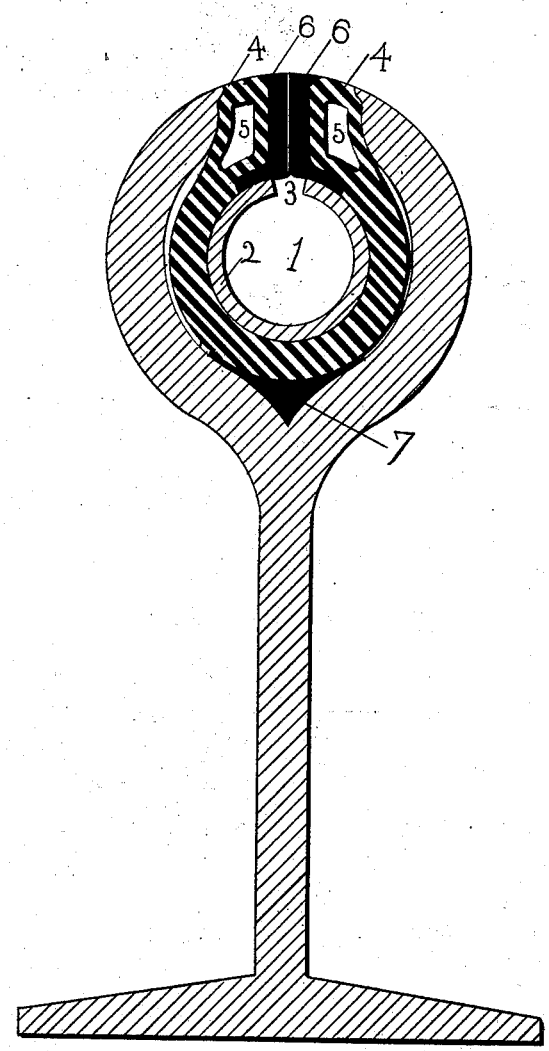
Figure 2:
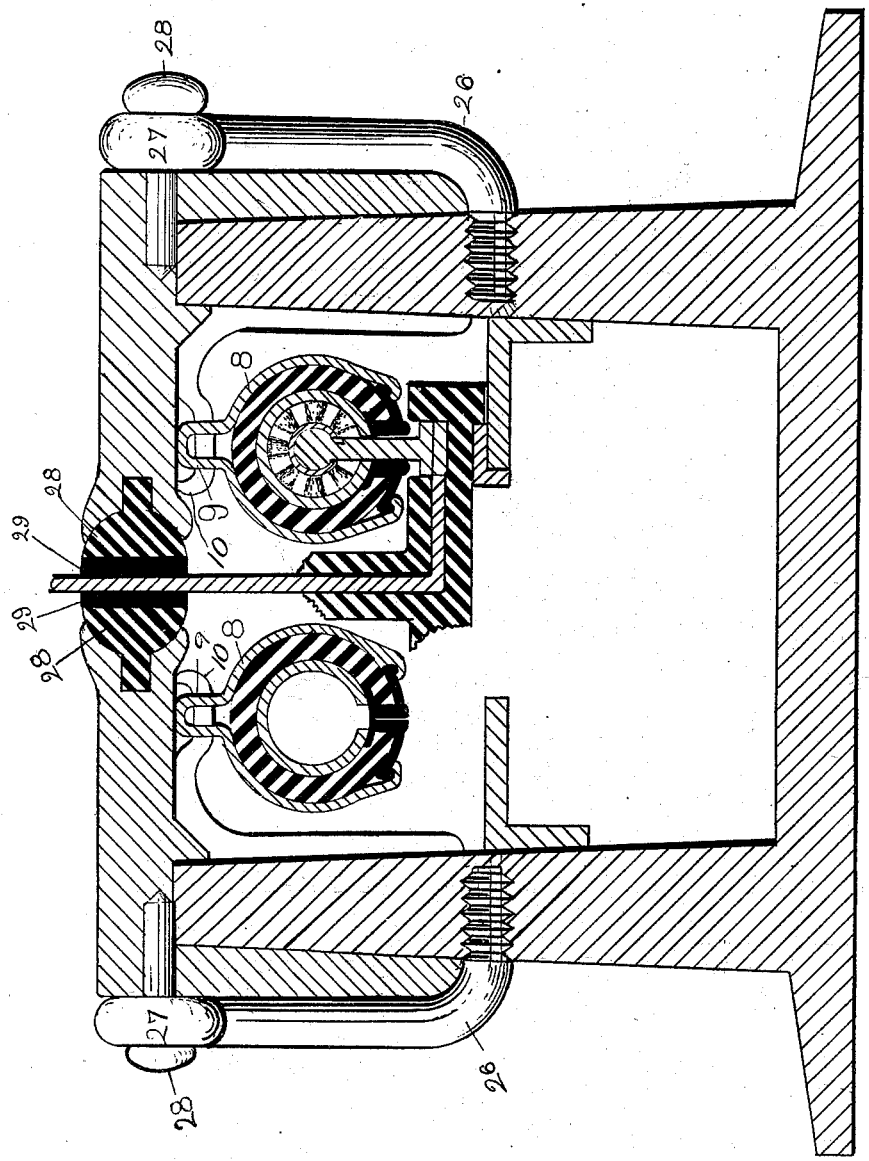
Figure 3:
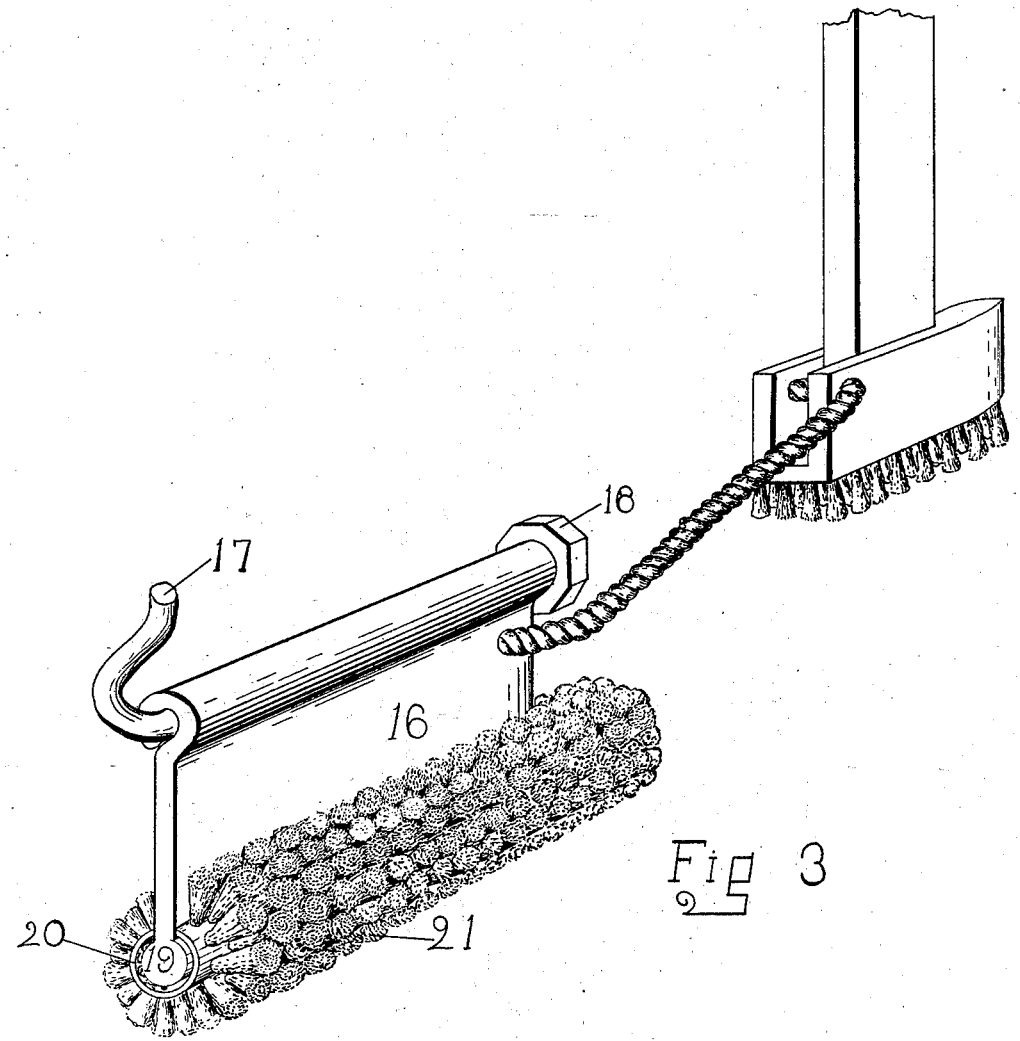
Figure 4:
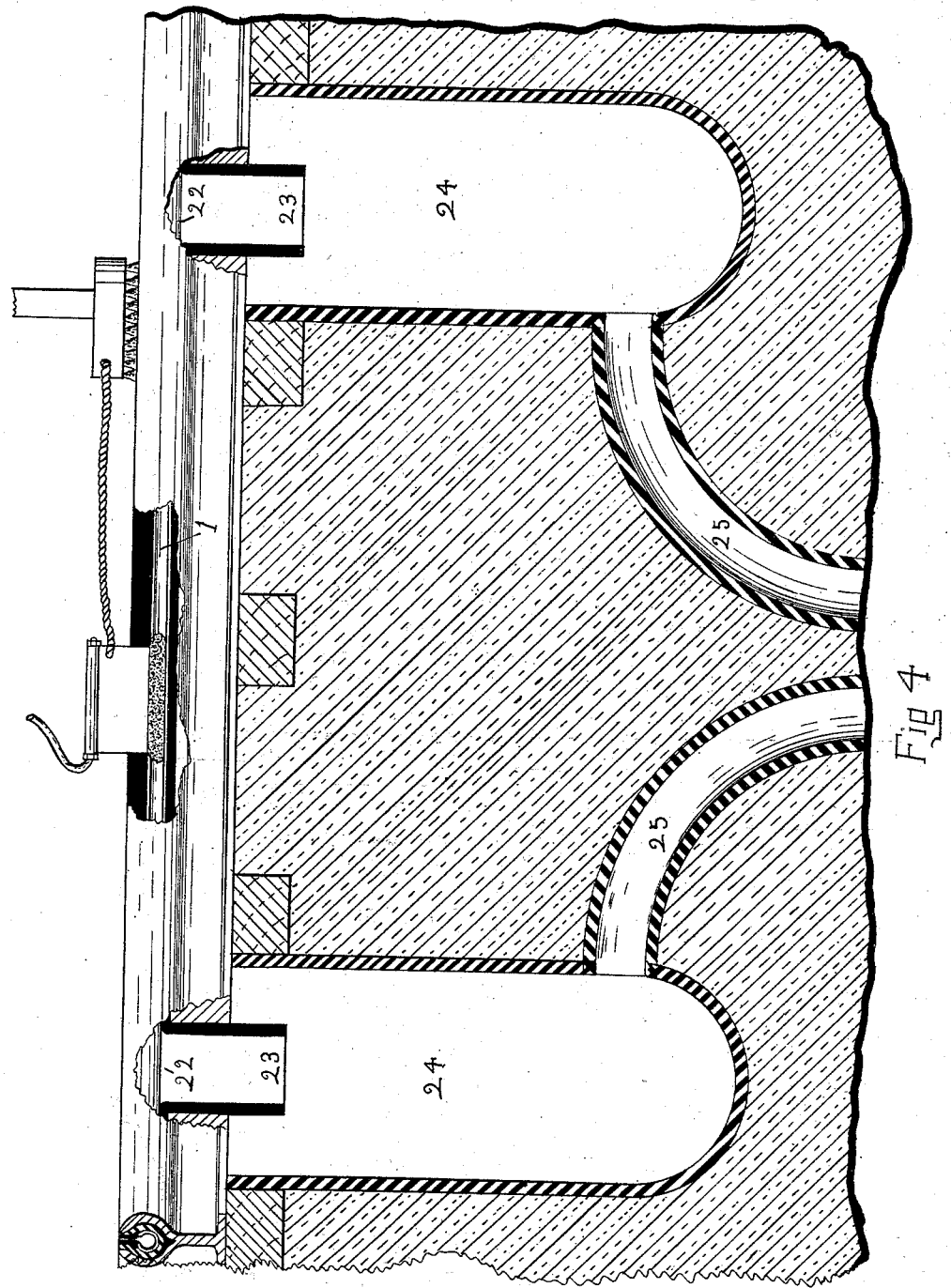
Figure 5:
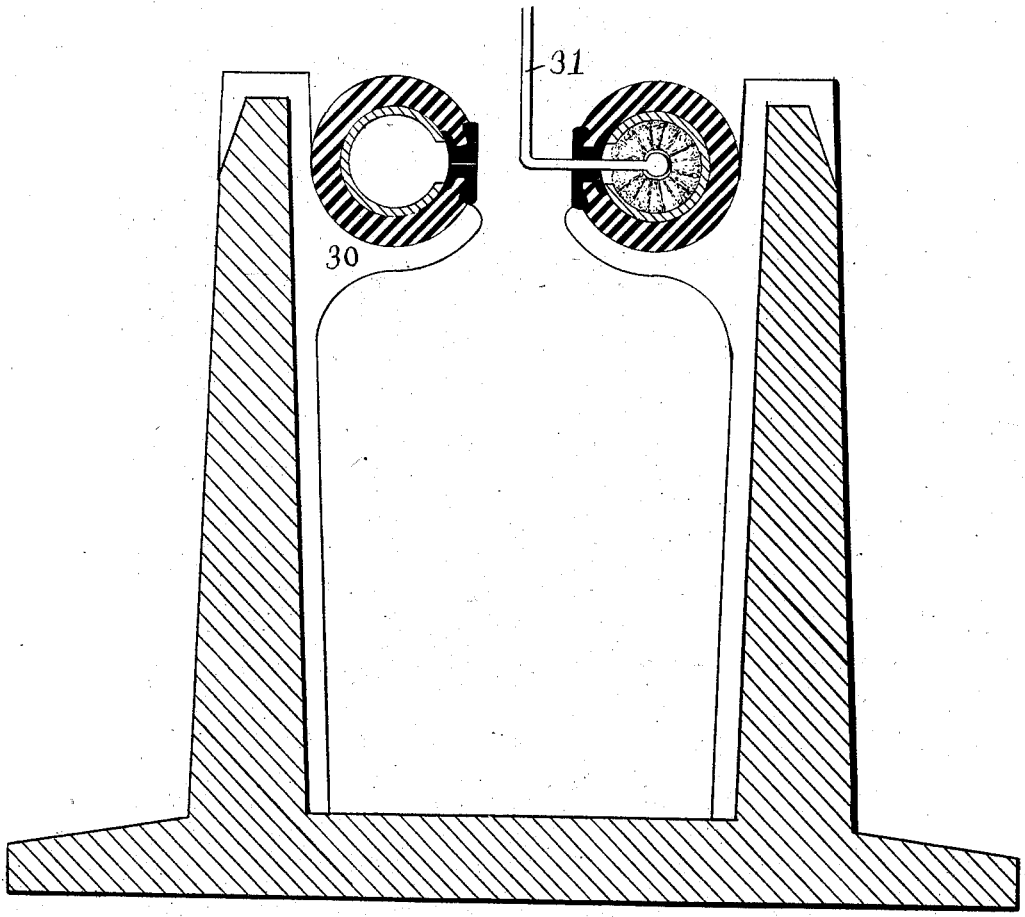

Figure 1 shows its application to a tubular rail. Figs. 2 and 5 show it in position and operation in a conduit. Fig. 3 shows the trolley and contact and clearing brushes. Fig. 4 shows the manner of drawing this appliance when set in the tubular rail.

Specifically described in detail, numeral 1 is a tube-chamber surrounded by a metal tube 2, having on one side a slot 3. Surrounding the tube is an envelop 4, of flexible insulation, perforated longitudinally with tubes 5 and having jaws 6, of hard rubber or similar insulation. The envelop 4 may be sectional for convenience of insertion and the form may vary to suit the situation. Where the tube-rail is used, cement insulation 7 is used below the division. When applied to the conduit system, the same form practically is used, but is clasped by the oblong clasp 8, through the top flange 9 of which the arm of a hook 10 passes to support it. When used for overhead systems, it is suspended by the flange 9, as in Fig. 2.

For operating this system I use a trolley, as shown in Fig. 3, where a plate of metal 16, curved over at one edge to receive the motor-connecting wire 17, which passes through it longitudinally and is secured by a nut 18 at the opposite end from its entrance-plate 16, is beaded at the opposite edge 19, and over this bead is slipped a split spring-tube 20, that forms a frame for many brush-wires 21, which fully fill the tube-chamber 1 and by means of which electricity is carried from the conductor-tube 2 to a motor on a car or vehicle, or vice versa, as the case requires. This blade or trolley may be moved with the vehicle in any preferred manner; but in the tubular system it is preferably towed by an insulated cable attached to the frame of a clearing-brush or to the leg supporting it. (See Fig. 3.) The trolley-blade may be coated or covered with insulating-enamel, which secures the current and renders the trolley-blade antifrictional. Where this appliance is used in a slotted-conduit system, the blade has a horizontal portion at the bottom instead of a bead and the extreme end is beaded and projects up, (see Fig. 2,) the body of the trolley being formed by an insulating block or body 30, provided with a wear-plate 31, adapted to run on a guide or rail 32 in the conduit.

Referring to Fig. 4, a slot 22 in the bottom of the conductor-tube 1 allows water and debris to fall through an oblong channel of insulation 23 into an insulated catch-basin 24, from which they may be raked out through a covered manhole at the top, while liquids pass off to the street-sewers through the pipe 25.

In Fig. 2 I show the manner of fastening the covers or angle-irons 33 on the conduit, consisting of a hooked bolt 26, screwed into the conduit-frame. The upper end of the bolt is formed into a ring 27, through which a pin 28 passes into the angle-iron, as shown, so that access to the conduit may be easily and quickly made. The lips of the angle-irons are grooved, and within the grooves I place a fillet of compressible insulation 28, having a face 29, of hard and smooth flexible insulation, which acts as jaws for the passage of a trolley-plate, its normal condition being closed to exclude debris from entering through the slot into the conduit.

In Fig. 5 is presented a modification of the conduit system, wherein the tube-conductor and its envelop rest on their sides in a hook or bracket 30, the mouths facing each other, the trolley-plate 31 being curved to enter the lips of the conductor.

In a contemporaneous application, Serial No. 541,385, I have claimed a rail having in the tread portion thereof a longitudinal recess for a conductor, with a slot opening into said recess, and also a conductor inclosed by slotted tubular insulation, combined with a resilient metallic sheath for closing the slot, and such constructions I do not herein claim.

Having thus described my invention, what I do claim as new, and desire to secure by Letters Patent, is—

1. In an electric railway, the combination with the longitudinally-slotted tubular conductor, the elastic and compressible insulation surrounding the said conductor having the coincident slot with its edges normally in contact and held with a yielding pressure by the elasticity of the insulation lying between the conductor and casing and a metallic casing surrounding the insulation and having a longitudinal opening coincident with the slots in the insulation and conductor; substantially as described.

2. In an electric railway, the combination with the slotted tubular conductor the elastic insulation surrounding the same and having the slot coincident to the slot in the conductor, the relatively hard wearing-lips held closed over the slot by the elasticity of the insulation and the metallic surrounding casing having an opening coincident with the opening between the lips and slot in the conductor; substantially as described.

3. In an electric railway, the combination with the slotted tubular conductor, of the trolley having the beaded plate and the sleeve carrying the contact-surfaces mounted on said bead; substantially as described.

4. In an electric railway, the combination with the slotted tubular conductor, of the trolley having the beaded plate, and a sleeve carrying a multiplicity of contacts mounted on said bead, substantially as described.

5. In an electric railway, the combination with the conduit having the upwardly-extending webs or sides, of the slot-rails having the depending flanges or webs and fastening-bolts secured to the sides of the conduit extending up on the outside of the slot-rails and fastenings uniting the ends of the bolts and slot-rails; substantially as described.

HENRY BRANDENBURG.

Witnesses:
  H. G. PATERSON,
  J. DEARDORFF.